(12) United States Patent
Kolhe

(10) Patent No.: US 8,644,855 B2
(45) Date of Patent: Feb. 4, 2014

(54) FEMTOCELL NETWORK FOR DETERMINING LOCATION OF A MOBILE DEVICE

(75) Inventor: Manish Kolhe, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/602,098

(22) Filed: Aug. 31, 2012

(65) Prior Publication Data

US 2013/0150084 A1 Jun. 13, 2013

Related U.S. Application Data

(60) Provisional application No. 61/569,782, filed on Dec. 12, 2011.

(51) Int. Cl.
*H04W 24/00* (2009.01)

(52) U.S. Cl.
USPC ............... 455/456.2; 455/404.1; 455/404.2; 455/415; 455/432.1; 455/435.1; 455/436; 455/440; 455/443; 455/444; 455/456.1

(58) Field of Classification Search
USPC ............... 370/254, 310, 329, 331, 335, 338; 455/404.1, 404.2, 415, 432.1, 435.1, 455/436, 440, 443, 444, 445, 456.1
See application file for complete search history.

(56) References Cited

U.S. PATENT DOCUMENTS

| | | |
|---|---|---|
| 8,000,709 B2 | 8/2011 | Burgess et al. |
| 2002/0042260 A1* | 4/2002 | Saucedo et al. ............... 455/404 |
| 2002/0042271 A1* | 4/2002 | Choi et al. .................... 455/437 |
| 2007/0149213 A1* | 6/2007 | Lamba et al. .............. 455/456.1 |
| 2008/0293433 A1 | 11/2008 | Wallis |
| 2009/0196253 A1 | 8/2009 | Semper |
| 2009/0311987 A1* | 12/2009 | Edge et al. ................. 455/404.1 |
| 2010/0144366 A1 | 6/2010 | Ishii et al. |
| 2010/0254355 A1 | 10/2010 | Abraham et al. |
| 2010/0298008 A1 | 11/2010 | Burroughs |
| 2011/0002239 A1 | 1/2011 | Venkatachalam |
| 2011/0053609 A1 | 3/2011 | Choi-Grogan |

FOREIGN PATENT DOCUMENTS

CN 102076086 A 5/2011

* cited by examiner

*Primary Examiner* — Wesley Kim
*Assistant Examiner* — Dinh P Nguyen

(57) ABSTRACT

A technique is provided for determining a location of a mobile device configured to a femtocell network. The technique includes a cluster of femtocell devices. Each of the femtocell devices is coupled to a macro network. The technique includes determining a position of mobile device coupled to a femtocell by transferring a request query to a switching device. The femtocell has been registered with the switching device.

15 Claims, 10 Drawing Sheets

MPCAP

| Field | VALUE | Type | Reference | Notes |
|---|---|---|---|---|
| Identifier | MPCAP implicit OCTET STRING | M | H G F E D C B A<br>1 0 0 1 1 1 1 1<br>1 0 0 0 0 0 1 0<br>0 1 0 0 1 1 1 1 | |
| Length | 01 | M | TIA/EIA/IS-812 | |

| Contents | | | | | | | | | |
|---|---|---|---|---|---|---|---|---|---|
| H | G | F | E | D | C | B | A | Octet | Notes |
| | | | 0x08 | | | | | 1 | The value of 8 Indicates a Femtocell Request |

FIG. 4

MSC Address

| Field | VALUE | Type | Reference | Notes |
|---|---|---|---|---|
| Identifier | MSC_Address implicit Digit Type | M | H G F E D C B A<br>1 0 0 1 1 1 1 1<br>1 0 0 0 0 0 1 0<br>0 0 0 1 1 1 0 0 | |
| Length | 7 octets | M | TIA/EIA-41-E | |
| Contents | | | | |

| H | G | F | E | D | C | B | A | Octet | Notes |
|---|---|---|---|---|---|---|---|---|---|
| | | | Type of Digits (0000 0010) | | | | | 1 | Not used |
| | | | Nature of Number (0000 0000) | | | | | 2 | |
| Numbering Plan (1101) | | | | Encoding (0001) | | | | 3 | |
| Point Code ( OPC in ORREQ) | | | | | | | | 4 | |
| | | | | | | | | 5 | |
| | | | | | | | | 6 | |
| Subsystem Number (SSN) | | | | | | | | 7 | |

FIG. 5

| GPOSREQ INVOKE PARAMETERS | M/O | TAG (HEX) | NOTES |
|---|---|---|---|
| POSITIONREQUESTTYPE | M | 9f 82 51 | |
| BILLING ID | O | 81 | b |
| ELECTRONICSERIALNUMBER | O | 89 | b |
| IMSI | O | 9f 81 72 | a |
| LCSBILLINGID | O | 9f 82 6f | b |
| LCSCLIENTID | O | 9f 82 67 | b |
| MOBILEPOSITIONCAPABILITY | M | 9f 82 4f | d |
| MOBILEIDENTIFICATIONNUMBER(MIN) | O | 88 | a |
| MOBINFO_CDMAMACRO | M | | e |
| MSCID (SERVING) | M | 95 | |
| NETWORKTMSI | O | 9f 81 69 | b |
| PQoSMACRO | O | | b |
| SERVINGCELLID | M | 82 | |
| MSC ADDRESS | M | 9f 82 1c | c |

FIG. 6

GPOSREQ RETURN RESULT PARAMETERS

| GPOSREQ RETURN RESULT PARAMETERS | M/O | TAG (HEX) | NOTES |
|---|---|---|---|
| POSITIONRESULT | M | 9f 82 52 | a |
| POSITIONINFORMATION | O | bf 82 50 | b |

FIG. 7

ISPOSREQ INVOKE PARAMETERS

| ISPOSREQ INVOKE PARAMETERS | M/O | TAG (HEX) | NOTES |
|---|---|---|---|
| POSITIONREQUESTTYPE | M | 9f 82 51 | |
| IMSI | O | 9f 81 72 | a |
| MOBILEIDENTIFICATIONNUMBER | O | 88 | a |

FIG. 8

ISPOSREQ RETURN RESULT PARAMETERS

| ISPOSREQ RETURN RESULT PARAMETERS | M/O | TAG (HEX) |
|---|---|---|
| POSITIONRESULT | M | 9f 82 52 |
| MSCID (CS) | M | 95 |
| POSITIONINFORMATION | M | bf 82 50 |
| SERVINGCELLID (FEMTO CELL) | M | 82 |

FIG. 9

FEMTOCELL NETWORK FOR DETERMINING LOCATION OF A MOBILE DEVICE

CROSS-REFERENCE TO RELATED APPLICATIONS

This application claims priority to U.S. Provisional Application No. 61/569,782 filed Dec. 12, 2011, commonly assigned, and hereby incorporated by reference in its entirety.

BACKGROUND OF THE DISCLOSURE

A femtocell is often a small cellular base station, typically designed for use in a home or small business setting. The femtocell connects to a service provider's network via a broadband (i.e., such as DSL or cable). As an example, femtocell designs typically support two to four active mobile phones in a residential setting and eight to sixteen active mobile phones in an enterprise setting. A femtocell allows service providers to extend service coverage indoors, especially where access would otherwise be limited or unavailable.

For a mobile operator, a femtocell improves both coverage and capacity, especially indoors. Additionally, the femtocell also provides for potentially better voice quality and battery life of the mobile device. The femtocell allows for delivery of telecommunication services, and in particular, cellular services with handsets. The femtocell uses access points, which couple to certain Internet access over a data line. Examples of femtocells have been deployed by a variety of service providers. Common distance ranges for the femtocell are on an order of about ten (10) meters or less, although there are variations depending upon the carrier.

Although successful, other features are often desired with a femtocell network.

BRIEF DESCRIPTION OF THE DRAWINGS

FIG. 4 is a table corresponding to a Mobile Positioning Capability ("MPCAP") value according to an example in the present disclosure.

FIG. 5 is a table corresponding to a Mobile Switching Center ("MSC") Address according to an example in the present disclosure.

FIG. 6 is a table corresponding to Geo Position Request ("GPOSREQ") Invoke Parameters according to an example in the present disclosure.

FIG. 7 is a table corresponding to GPOSREQ Return Result Parameters according to an example in the present disclosure.

FIG. 8 is a table corresponding to Inter Position Request ("IPOSREQ") Invoke Parameters according to an example in the present disclosure.

FIG. 9 is a table corresponding to IPOSREQ Return Result Parameters according to an example in the present disclosure.

DETAILED DESCRIPTION OF SPECIFIC EMBODIMENTS OF THE DISCLOSURE

Figure 1:
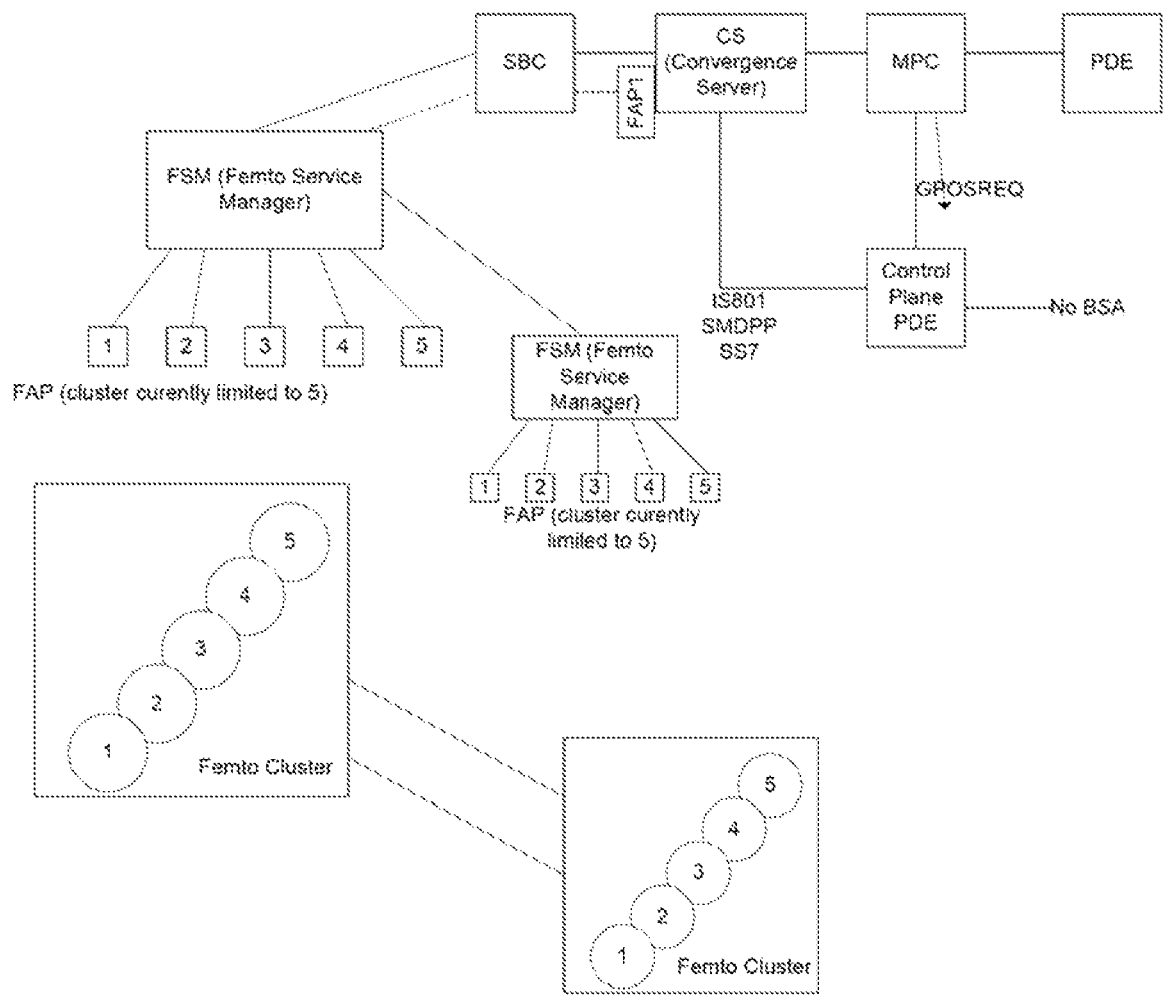
FIG. 1 is a simplified diagram of a femtocell network according to an example in the present disclosure.

According to the present disclosure, techniques related to telecommunication networks are provided. More particularly, the present disclosure provides a method and system for tracking a user's location in a femtocell network, alone or in combination with other networks. Merely by way of example, the user's location may be tracked during an event such as an emergency, security, or others using a femtocell network. Of course, there can be other variations, modifications, and alternatives.

In an example, the present disclosure provides a method of determining a location of a mobile device configured to a femtocell network including femtocell devices. The method includes providing a cluster of the femtocell devices. Each of the femtocell devices is coupled to a femtocell manager, which is coupled to a data network, which is coupled to a cellular network system. In this example, the femto cell manager is provided in either a combination of hardware and/or software to oversee the operation (i.e., operating system) of the femtocell devices. The method includes determining a position of mobile device coupled to a femtocell by transferring a request query to a switching device causing the femtocell to be registered with the switching device. The method identifies a macro network configured with the femtocell and determines a topology of a surrounding geographic region from information stored in a database, including static and dynamic.

In an alternative example, the present disclosure provides a system for determining a location of a mobile device configured to a femtocell network. The system includes a cluster of femtocell devices. Each of the femtocell devices is coupled to a femtocell manager, which is coupled to a data network. The data network is coupled to a cellular network system. The system also includes a handling device configured for transferring a request query to a switching device. The femtocell is registered with the switching device. The system has a location process configured to identify a macro network (e.g., larger network such as cellular network) configured with the femtocell and a topology process (e.g., physical and logical) configured to determine a topology of a surrounding geographic region from information stored in a database. In this example, the topology process identifies physical information such as connection, layers, and switch information, and/or logical information regarding the network and/or connected devices.

Benefits are achieved using the present method. As an example, the present method and system provide for location tracking of a user in a femtocell network. In an example, the present method and system determine the geographical position of a mobile device served by a femtocell using network specific information. Additionally, the method and system can also be used along with femtocell and/or handsets that have Global Position System ("GPS") capability. In an example, the geographical position can be tracked within an accuracy of within five (5) meters and less using the GPS capability. These and other benefits are achieved using one or more of the benefits described herein and other parts of the present specification.

In a specific example, the present method and system may use the following definitions, acronyms, and the terms, although there may be variations.

| Term | Definition |
| --- | --- |
| ANSI T1.114-1996 | American National Standards Institute Standard for Telecommunications - Signaling System Number 7 (SS7) - Transaction Capabilities Application Part (TCAP). |
| APDU | Application Protocol Data Unit |
| ASE | Application Service Element |
| BCD | Binary Coded Decimal |
| CAMEL | Customized Applications for Mobile Network Enhanced Logic. A combination of GSM and INAP |
| CGI | Cell Global Identification |
| CLM | Coarse Location Message |
| CS | Convergent Server |
| ETSI | European Telecommunication Standards Institute |
| ERAD | Exception Reporting and Alarms Distribution |
| ESI | Engineering Statement of Intent |
| GPOSREQ | Geo Position Request |
| GSM | Global System for Mobile communications |
| HEPE | Horizontal Error Position Estimate |
| HLR | Home Location Register |
| HGI | HLR Generic Interface |
| IMSI | International Mobile Subscriber Identity |
| INAP | Intelligent Network Application Protocol |
| IP | Intelligent Peripheral (INAP physical plane) |
| IS-41 | Telecommunications Industry Association/Electronic Industries |
| IS-41B | Association Interim Standard 41: Cellular Radio |
| IS-41B+ | Telecommunications Intersystem Operations. Rev B and Rev C are |
| IS-41C | standards. Rev B+ is a vendor extension to the Rev B standard for use with the vendor HLR. |
| ISDN | Integrated Services Digital Network |
| ISUP | ISDN User Part |
| ITU | International Telecommunication Union |
| LFS | Location Finding System: A system that determines the location of subscriber units and provides access to this information through an open interface; encompasses the Location Finding Controller and Location Cache. |
| LMSI | Local Mobile Subscriber Identity |
| LSB | Location Sensitive Billing |
| IN Location | Software application of Open wave Systems, Inc. |
| MAR | Maximum Antenna Range |
| MPC | Mobile Positioning Center |
| Mobile Identification Number | A label that uniquely identifies a mobile unit; usually its "phone number" |
| MO | Mobile Originated |
| MS | Mobile Station |
| MSC | Mobile Switching Center |
| MSCID | Unique Mobile Switching Center identifier |
| MSISDN | Mobile Station International Subscriber Device Number. MSISDN is composed of the Country Code, National Destination Code, and Subscriber Number and is used to identify a mobile subscriber. MSISDN is represented by the Calling Party Number parameter or in messages that contain the MSISDN parameter. |
| MTP | Message Transfer Part. MTP with SCCP form the Presentation, Session, and Transport layer protocol for SS7 messages. |
| NID/SID | Network ID/Sector ID |
| NSK | Non Stop Kernel |
| PDE | Position Determination Equipment |
| PDU | Protocol Data Unit |
| Point Code | The identifier for an SS7 network element. |
| SBC | Session Boarder Controller |
| SCCP | Signaling Connection Control Part. SCCP with MTP form the Presentation, Session, and Transport layer protocol for SS7 messages. |
| SCF | Service Control Function (INAP functional plane) |
| SCP | Service Control Point (INAP physical plane) |
| SDF | Service Data Functions |
| SMS | Short Message Service: A facility for delivering short text messages to a mobile station |
| SRF | Specialized Resource Function (INAP functional plane) |
| SS7 | Signaling System Number 7 telephony network. |
| SSF | Service Switching Function (INAP functional plane) |
| SSN | Sub-System Number; Identifies the sub-system within an SS7 network element |
| SSP | Service Switching Point (INAP physical plane) |
| Subscriber | A person who utilizes the wireless system |
| System Manager | An agent of the Wireless Operator who is responsible for managing the system |
| TCAP | Transaction Capabilities Application Part; the Application layer protocol for SS7 messages |

| Term | Definition |
| --- | --- |
| TMSI | Temporary Mobile Subscriber Identity |
| Wireless Operator | The organization that provides wireless service in a particular area |
| WLA | Wireless Location Application |

FIG. 1 is a simplified diagram of a femtocell network according to an example of the present disclosure. This diagram is merely an example, which should not unduly limit the scope of the claims herein. One of ordinary skill in the art would recognize other variations, modifications, and alternatives. In a specific example, the present system uses a plurality of femtocell devices configured within an enterprise network, which is coupled to the Internet or other external network via interface ports. The femtocell devices extend coverage in tough to reach areas or other in various situations, including private and public. In an example, the present system can be used with a network such as CDMA, alone or in combination with others, and the like. The example includes location tracking of a caller or handset within a femtocell network according to an example of the present disclosure. In a specific example, the system includes a plurality of femtocell devices where each of these devices is coupled to femtocell service manager (FSM). Each FSM may include a cluster of femtocell devices. The system also includes other elements, as shown. The elements include a Convergent Server, a Mobile Positioning Center (MPC), a Position Determination Equipment (PDE), and a Session Boarder Controller (SBC). Of course, there can be other variations, modifications, and alternatives. Further details of the present system can be found throughout the present specification and more particularly below.

In a specific example, the present system includes various features. That is, the present system includes an Origination Request (ORREQ) Trigger. The system is able to receive the ORREQ trigger from the Open Process Control (OPC) from a Convergent Server to begin the new functionality or process. Once the process has been initiated, the receipt of the ORREQ's OPC also triggers the call to be logged as a femtocell call via a position source and/or other record information. The system also includes system logging, among other functions. That is, the system is able to log the activities of the call and its related flow.

In an example, the system has the PDE system that supports the GPOSREQ, gposreq_rr (which is the return message for the GPOSREQ), ISPOSREQ, and isposreq_rr (which is the return message for the ISPOSREQ) call flows. The system provides for the MPCAP to be passed in the GPOSREQ as well as the new parameter to pass the OPC of the CS. The system also includes operational management pegs added to an LMEE program to cover certain added functionality so that logging can be performed on the system. An example of such program is the OpenWave Location Manager LMEE product from Openwave Systems Incorporated of Redwood City, Calif., but can be others. The system includes desirable performance and throughput for communications traffic. Preferably, the system can handle no more than 20 Transactions Per Second ("TPS") in order to account for the amount of calls, but can have variations. The system includes the Mobile Positioning Center to support MPCAP over GPOSREQ and MPC to support MSC Address parameter in GPOSREQ to deliver OPC/CS address to PDE.

In an example, the present disclosure provides a method and system for determining a geographical position of a mobile device (e.g., handset, smart phone, tablet computer, computing or telecommunication device) being serviced by a femtocell using data collected from a telecommunication network. The femtocell can be moved from one geographical location to another without the network operator being notified and hence it is possible to store information regarding the femtocell's location and the surrounding topology (i.e., physical and/or logical) in a database. Preferably, the position of the femtocell can be determined by sending an ISPOSREQ query to the Switch (MSC)/Soft Switch, which has registered the femtocell. In an example, the geographical location of a macro network in which the femtocell is registered can be used to determine the topology of the surrounding area from a database. The Maximum Antenna Range of the femtocell can also be stored in a database and can be configured based on the Market ID and Switch defining the macro network, which includes the femtocell.

In an example, the present disclosure provides a method and system including a positioning engine. The positioning engine determines (or calculates) the geographic position of a mobile device served by a particular femtocell. The positioning engine preferably stores the topology details of each individual market areas comprising the operators of the network. Each market area (or area) can be identified by (1) Market ID, (2) Switch Number, and other information, if desired. In a specific example, the Maximum Antenna Range for the femtocells in a given area can be set to a value independent of other areas. The positioning engine can gather the location of the femtocell by sending an ISPOSREQ invoke to the serving soft switch of the femtocell under inquiry.

Figure 2:
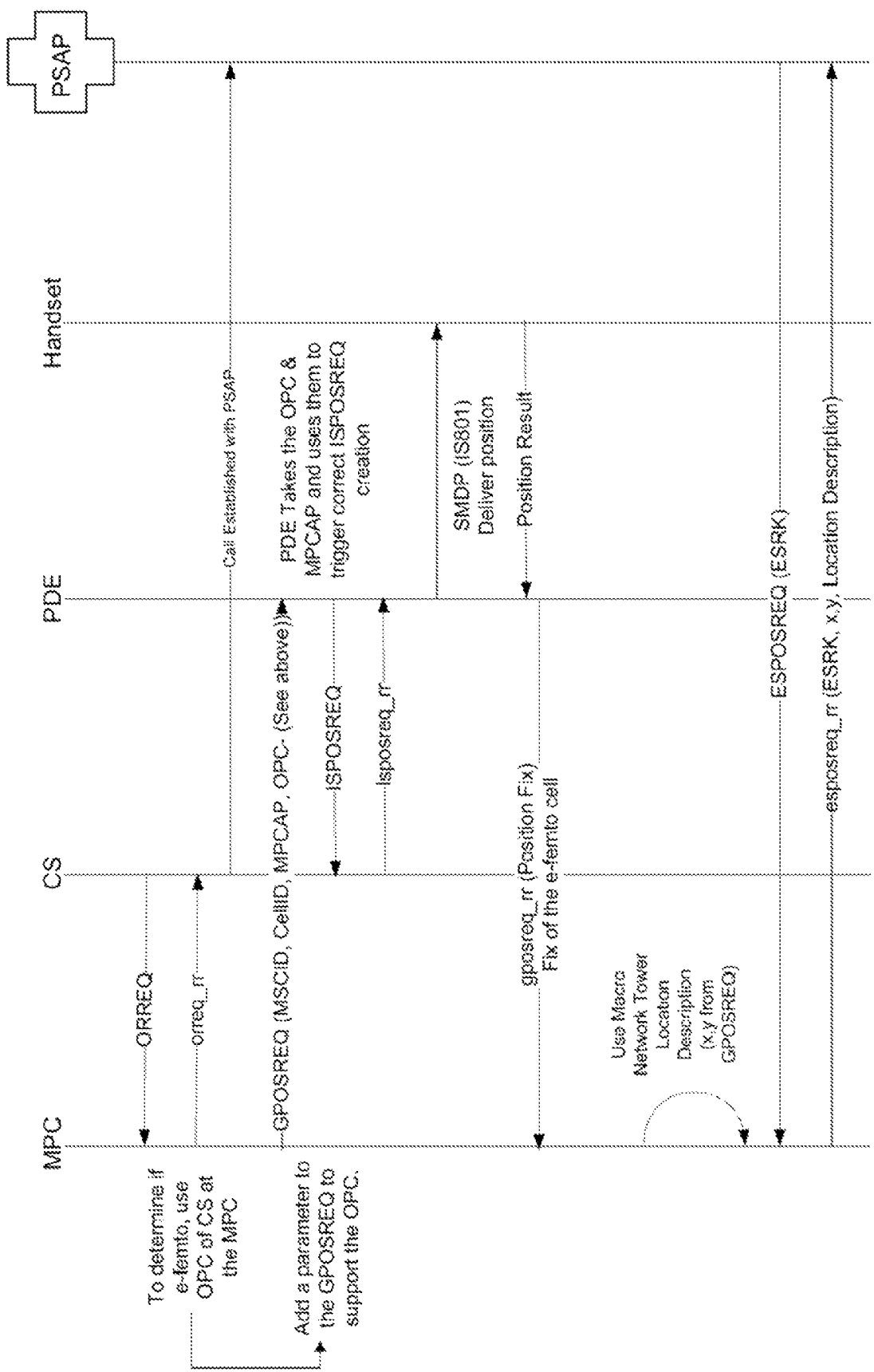
FIG. 2 is a flow diagram for a call procedure in a femtocell network according to an example in the present disclosure.
Figure 3:
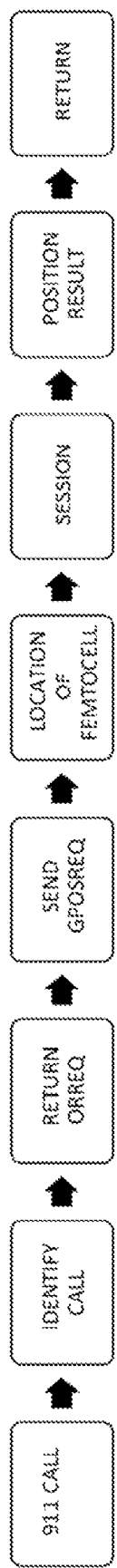
FIG. 3 is a simplified flow diagram of a method of tracking a call location in a femtocell network according to an example in the present disclosure.

FIG. 2 is a simplified diagram of a call flow process according to an example of the present disclosure. This diagram is merely an example, which should not unduly limit the scope of the claims herein. One of ordinary skill in the art would recognize other variations, modifications, and alternatives. A brief overview of the present method is outlined below, which is also referenced in FIG. 3.

1. Initiate connection via mobile handset and femtocell within a femtocell cluster such that a connection is initiated via the femtocell device within the cluster.

2. Mobile Positioning Center receives, for example, a 9-1-1 call via the ORREQ and registers the OPC from the CS.

3. The MPC identifies the call as a femtocell call and initiates the call procedures for the femtocell call.

4. The orreq_rr is returned to the CS and the MPC continues to use the macro cell ID off of the initial ORREQ.

5. MPC sends GPOSREQ to the PDE. The GPOSREQ includes MSCID, Cell ID as well as the mandatory fields of MPCAP and OPC, which resides in the MSC value in the GPOSREQ.

6. PDE uses the information to create an ISPOSREQ to send to the CS to identify the location of the mobile handset's femtocell.

7. PDE then performs an IS801 session with its SMDP message.

8. A position result is obtained and sent to the MPC via the gposreq_rr.

9. MPC returns gposreq_rr to the PSAP. That is, a new class of service is returned.

10. Perform other steps, as desired.

The above sequence of steps provides a call tracking method according to this example of the present disclosure. As shown, the call tracking process, which is provided within a femtocell network, uses certain instructions to determine the location of a call within the femtocell network configured within a larger macro network. Depending upon the example, certain steps may be added, removed, or modified. Further details of the present method can be found by way of the examples below.

To prove the principles and operation of the present method and system, certain experiments and simulations were performed. These experiments were merely examples, which should not unduly limit the scope of the claims herein. One of ordinary skill in the art would recognize other variations, modifications, and alternatives. As an example, the present method and system coupled various aspects with a location manager program configured to a cluster of femtocells within a macro cell network. An example of such program is the OpenWave Location Manager LMEE product from Openwave Systems Incorporated of Redwood City, Calif., but can be others.

In this example, the present OpenCall Control Plane PDE can identify a call originated from a femtocell cluster based on the value of the MPCAP parameter in the GPOSREQ Invoke message. PDE can then use the Soft Switch Address provided by the MPC in the GPOSREQ Invoke to get the Serving Femtocell's Position and use that to create a dynamic Base Station Almanac ("BSA") entry as a starting point to perform more precise AFLT and AGPS positioning depending on the device and network capability. Other features are described below.

A femtocell data management table built from the master BSA database is included. The table can be populated automatically during install/setup using the average field values for the BSA records in a given MarketID/SwitchNumber network area in the master BSA Database. The table along with the data from isposreqrr can be used to dynamically create a femtocell BSA record to be inserted into the process memory. In the present example, the following features are described under the bolded headings.

GPOSREQ Invoke Changes

GPOSREQ invoke message sent to PDE to request position of a mobile device in a femtocell cluster can include the MPCAP and MSC Address parameters as described in FIGS. 4 and 5. The MPC can be desired to include these Address parameters in the GPOSREQ invoke request sent to the PDE. Again, the Address parameters are described in the Figure. See, for example, MPCAP in FIG. 4 and MSC Address parameters in FIG. 5.

GPOSREQ Invoke Parameters, GPOSREQ Return Result Parameters

MPC can be desired to send GPOSREQ invoke for a femtocell call as specified below. The request can be in conformance with J-STD-036-A except for the MPCAP and MSC Address parameters as described. The GPOSREQ invoke parameters are listed in FIG. 6. The GPOSREQ parameters are listed in FIG. 6 with a "Notes" column. An "a" present in the "Notes" column can note that MIN or IMSI should be present. A "b" present in the "Notes" column can note to include if available. A "c" present in the "Notes" column can note this is a new feature specific proprietary parameter and shall include the PC and SSN for the Convergent Server hereby referred to as PC_CS and SSN_CS. A "d" present in the "Notes" column can note that this will indicate that this is a Femtocell call. An "e" present in the "Notes" column can note value set per J-STD-036—800-30007-004 Rev.D. The hex dump of FIG. 6 can be:

Hex Dump:
9F 82 51 02 02 03
<Min or IMI>
88 05 XX XX XX XX XX OR 9F 81 72 08 XX XX XX XX XX XX XX XX
9F 82 4F 01 08
MobInfo_CDMA Macro <Variable Length>(PDE shall accept a value of ZERO)
95 03 XX XX XX
82 02 XX XX
9F 82 IC 07 02 00 D1 XX XX XX XX. The GPOSREQ return result parameters are listed in FIG. 7. The GPOSREQ parameters are listed in FIG. 7 with a "Notes" column. An "a" present in the "Notes" column can note that it identifies the type of success or failure of the associated positioning request. A "b" present in the "Notes" column can note to include if the positioning information was successfully obtained. The hex dump of FIG. 7 can an be: Hex Dump: 9F 82 52 01 XX <XX =02 for Success and 04 for Failure>BF 82 50 LL 9F 82 4B06 XX XX XX XX XX XX 9F 82 4D <variable length>.

ISPOSREQ Invoke Parameters, ISPOSREQ Return Result Parameters

The ISPOSREQ invoke parameters are listed in FIG. 8. The GPOSREQ parameters are listed in FIG. 8 with a "Notes" column. An "a" present in the "Notes" column can note that at least one of these elements is required to identify the MS. A "b" present in the "Notes" column can note MTP DPC shall be set to PCSSN from the MSC_Adress parameter in the GPOSREQ INVOKE message. A "c" present in the "Notes" column can note SCCP Called Party Address shall be set to PCSSN from the MSC_Address parameter in the GPOSREQ INVOLE message. The hex dump of FIG. 8 can be:

Hex Dump:
9F 82 51 02 02 03
<MIN or IMSI>
88 05 XX XX XX XX XX OR 9F 81 72 08 XX XX XX XX XX XX XX XX. The ISPOSREQ return result parameters are listed in FIG. 9. The hex dump of FIG. 9 can be:
Hex Dump:
9F 82 52 01 xx <xx =02 for Success and 04 for Failure >95 03 xx xx xx
BF 82 50 LL 9F 82 4B 06 xx xx xx xx xx xx 9F 82 4D <variable length>
82 02 xx xx.

Figure 10:
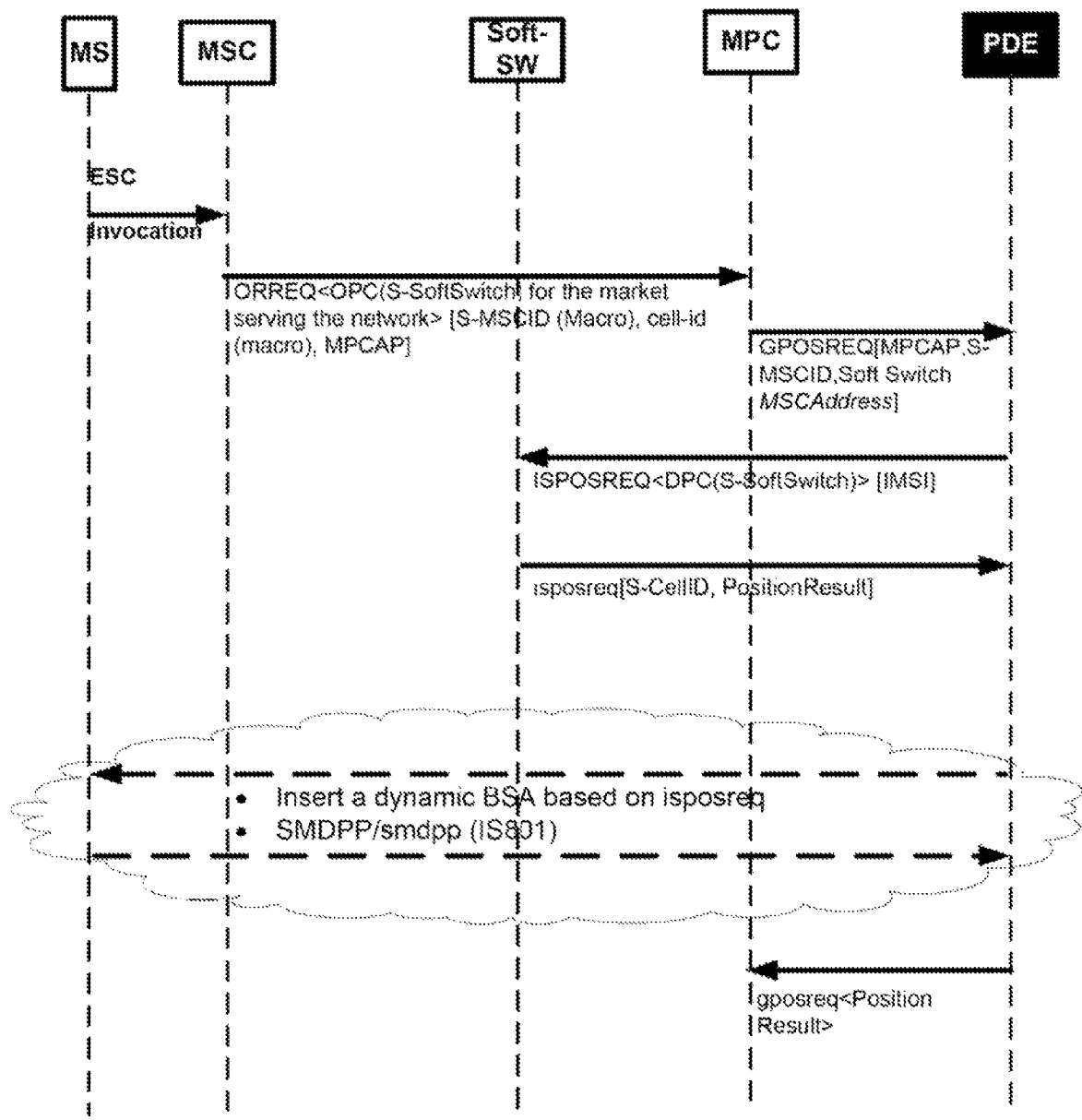
FIG. 10 is a simplified flow diagram of a method of network positioning call flow in a femtocell network according to an example in the present disclosure.

A simplified diagram of a femtocell call process is illustrated in FIG. 10. As shown, the call flow includes MS, MSC, Soft-SW, MPC, and PDE, among others. The call flow is shown and described in the Figure.

Below is the list of functional areas that may be included in the examples.

Femtocell Data Management

The Femtocell Data Management functionality provides initial positioning with fields as indicated in the tables below:

TABLE 1

FemtocellMktID-SwNo Database
This table can be bulk loaded.

| PARAMETER | DEFAULT | VALID RANGE | Data SOURCE |
|---|---|---|---|
| MarketID | None | Configurable | Master BSA Database |
| Switch Number | None | Configurable | Master BSA Database |
| MAR | 20 m/Configurable | Configurable | Configured using the Femtocell Data Management Provisioning Interface |
| Bldg. Average Height | 15 m/Configurable | Configurable | Configured using the Femtocell Data Management Provisioning Interface |
| AntAlt | 0 m/Configurable | −1.000 to +10000 | This will be equal to the MarketID Terrain Altitude average plus Bldg. average height and will be calculated internally by PDE when not given a value. |
| AntHEPE | 0 m/Configurable | 1 to 65535 | This will be equal to a PDE configurable factor (f/ex, 0.5) multiplied by the MAR for the entry. Ex: If MAR = 50 m, AntHEPE = 0.5 × 50 m = 25 m |

TABLE 2

Ubicell SID specific configuration
This table is created and used internally by PDE
and is included here for information purpose only.

| PARAMETER | Data SOURCE |
|---|---|
| MarketID | Imported from Master BSA database |
| Avg PN Increment | Calculated from the Master BSA database. |
| Terrain Height Average | Calculated from the Master BSA database. |
| Terrain Height StdDev | Calculated from the Master BSA database. |

Configuration and Interfaces

A CLI tool can be provided to configure the femtocell table. An administrative process configures a femtocell table to indicate the properties of femtocells in a given MarketID/Switch Number network area. A configuration or a Key will be added to enable or disable femtocell processing.

Logging

The method and system include alarms and metrics where appropriate to report error conditions and usage. This will include adding femtocell specific logging to .csv files.

Features

PDE provides the ability to identify a positioning request as being originated from a femtocell cluster based on the MPCAP value in the GPOSREQ Invoke message.
PDE provides the ability to send ISPOSREQ Invoke to the Convergent Server Switch identified by the MSC Address parameter included in the GPOSREQ Invoke message from MPC.
PDE provides the ability to use the femtocell position information returned in isposreq return result as initial position and provide more precise positioning based on the device and network capability.

In this example, the Altitude parameter returned in the Location Response will have the value provided by the PDM.

Each CPU will have one Instance of the PDE Framework process running on the particular CPU. The femtocell from which the positioning request was made and the associated Soft Switch whose Point Code is delivered to PDE in GPOSREQ Invoke supports the following features: (1) the ability to support standard IS-801 messages; (2) there will be at least one pre-existing, non-dynamic entry in the BSA database with the MarketID and Switch Number value in the BSA record being created dynamically; (3) Isposreq return result from the soft switch can include the position of the serving femtocell defined as the one the call was originated from; (4) the femtocell cluster can not have a coverage area greater than preconfigured value in PDE; (5) The femtocell Serving Cell ID can be unique to the macro network MarketID/Switch Number combination; (6) reloading the BSA database may result in failed calls. In this example, GPOSREQ Invoke is characterized by a value set per J-STD-036-800-30007-004 Rev. D, but can be others. MPC can extract the value from the MobInfo parameter in the ORREQ. PDE can also accept a value of zero for the MobInfo parameter.

It should be understood that the description recited above is an example of the disclosure and that modifications and changes to the examples may be undertaken which are within the scope of the claimed disclosure. Therefore, the scope of the appended claims should be accorded the broadest interpretation so as to encompass all such modifications and similar arrangements, including a full scope of equivalents.

The invention claimed is:

1. A method of determining a location of a mobile device configured to a femtocell network, the method comprising:
   transferring a request query to a switching device coupled to a cluster of femtocell devices, wherein transferring includes:
      receiving an origination request (ORREQ) trigger from an open process control (OPC) of a convergent server (CS); and
      returning an origination request return result (orreq_rr) to the CS and a mobile positioning center (MPC);
   determining a position of the mobile device coupled to a femtocell device within the cluster of femtocell devices by initiation of the request query to the switching device, the femtocell device being registered with the switching device, wherein determining includes:

sending a geo position request (GPOSREQ) to a position determination equipment (PDE);
creating an inter-system position request (ISPOSREQ);
sending the ISPOSREQ from the PDE to the CS to identify a location of the mobile device; and
sending the location of the mobile device to the MPC via a geo position request return result (gposreq_rr);
identifying a macro network configured to the femtocell device; and
determining a topology of a surrounding geographic region from information in a database.

2. The method as recited in claim 1 wherein the request query is ISPOSREQ.

3. The method as recited in claim 1 wherein the switching device comprises an MSC/Soft Switch; each of the femtocell devices being coupled to a femtocell manager, the femtocell manager being coupled to a data network, the data network being coupled to a cellular network system.

4. The method as recited in claim 1 wherein the database comprises a static database.

5. The method as recited in claim 1 wherein the femtocell device is characterized by a maximum antenna range, the maximum antenna range based on a Market ID and MSC.

6. The method as recited in claim 1 further comprising initiating an emergency call from the mobile device serviced by and connected to the femtocell device.

7. The method as recited in claim 6 wherein the emergency call is a 911 call.

8. The method as recited in claim 1 wherein the determining of the topology of the surrounding geographic region provides position information of the position of the mobile device.

9. The method as recited in claim 1 wherein the transferring the query request is initiated by the mobile device.

10. The method as recited in claim 1 wherein the switch is provided in an OPC.

11. A system for determining a location of a mobile device configured to a femtocell network, the system comprising:
a cluster of femtocell devices, each of the femtocell devices being coupled to a femtocell manager, the femtocell manager being coupled to a data network, the data network being coupled to a cellular network system;
a handling device configured for transferring a request query to a switching device having a femtocell registered with the switching device, wherein transferring includes:
receiving an origination request (ORREQ) trigger from an open process control (OPC) of a convergent server (CS); and
returning an origination request return result (orreq_rr) to the CS and a mobile positioning center (MPC);
a determining process to determine a position of the mobile device coupled to any of the femtocell devices within the cluster of femtocell devices by initiation of the request query to the switching device, wherein to determine includes:
to send a geo position request (GPOSREO) to a position determination equipment (PDE);
to create an inter-system position request (ISPOSREQ);
to send the TSPOSREQ from the PDE to the CS to identify a location of the mobile device; and
to send the location of the mobile device to the MPC via a geo position request return result (gposreg$_{13}$_rr);
a location process configured to identify a macro network configured with the femtocell device; and
a topology process configured to determine a topology of a surrounding geographic region from information in a database.

12. A method of determining a location of a mobile device configured to a femtocell network, the method comprising:
transferring a request to a switching device, the switching device coupled to a femtocell within a cluster of femtocell devices, the cluster of femtocell devices being coupled to a cellular network system, wherein transferring includes:
receiving an origination request (ORREQ) trigger from an open process control (OPC) of a convergent server (CS); and
returning an origination request return result (orreq_rr) to the CS and a mobile positioning center (MPC);
determining a position of mobile device coupled to a femtocell by initiation of the request query to the switching device, the femtocell being registered with the switching device, wherein determining includes:
sending a geo position request (GPOSREQ) to a position determination equipment (PDE);
creating an inter-system position request (ISPOSREQ);
sending the ISPOSREQ from the PDE to the CS to identify a location of the mobile device; and
sending the location of the mobile device to the MPC via a geo position request return result (gposreg_);
identifying a macro network configured to the femtocell; and
determining a topology of a surrounding geographic region from information in a database.

13. The method as recited in claim 12 wherein the femtocell is characterized by a maximum antenna range, the maximum antenna range based on a Market ID and MSC.

14. The method as recited in claim 12 wherein the database is static; and wherein the switching device comprises a soft switch.

15. The method as recited in claim 12 wherein the determining comprising identifying the femtocell registered to the switching device.

* * * * *

UNITED STATES PATENT AND TRADEMARK OFFICE
CERTIFICATE OF CORRECTION

PATENT NO. : 8,644,855 B2  
APPLICATION NO. : 13/602098  
DATED : February 4, 2014  
INVENTOR(S) : Manish Kolhe Page 1 of 1

It is certified that error appears in the above-identified patent and that said Letters Patent is hereby corrected as shown below:

In the Specification:

In column 8, line 27, delete "an be:" and insert -- be: --, therefor.

In column 8, line 40, delete "MSC_Adress" and insert -- MSC_Address --, therefor.

In column 8, line 44, delete "INVOLE" and insert -- INVOKE --, therefor.

In the Claims:

In column 12, line 4, in Claim 11, delete "(GPOSREO)" and insert -- (GPOSREQ) --, therefor.

In column 12, line 7, in Claim 11, delete "TSPOSREQ" and insert -- ISPOSREQ --, therefor.

In column 12, line 10, in Claim 11, delete "(gposreg$_{13}$ rr);" and insert -- (gposreq_rr); --, therefor.

In column 12, line 39, in Claim 12, delete "(gposreg_);" and insert -- (gposreq_rr); --, therefor.

Signed and Sealed this  
First Day of July, 2014

Michelle K. Lee  
*Deputy Director of the United States Patent and Trademark Office*